(12) United States Patent
Fahn et al.

(10) Patent No.: US 8,587,612 B2
(45) Date of Patent: Nov. 19, 2013

(54) METHOD AND SYSTEM FOR PROVIDING AUGMENTED REALITY BASED ON MARKER TRACKING, AND NON-TRANSITORY COMPUTER-READABLE MEDIUM THEREOF

(75) Inventors: Chin-Shyurng Fahn, Taipei (TW); Yen-Shiung Huang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 691 days.

(21) Appl. No.: 12/832,078

(22) Filed: Jul. 8, 2010

(65) Prior Publication Data
US 2011/0157179 A1 Jun. 30, 2011

(30) Foreign Application Priority Data
Dec. 29, 2009 (TW) .............................. 98145639 A (51) Int. Cl.
*G09G 5/00* (2006.01)
*G06K 9/00* (2006.01)
*G06K 9/48* (2006.01)

(52) U.S. Cl.
USPC ............ 345/619; 345/633; 382/181; 382/199

(58) Field of Classification Search
None
See application file for complete search history.

(56) References Cited

U.S. PATENT DOCUMENTS

2005/0069196 A1* 3/2005 Uchiyama et al. ............ 382/154

OTHER PUBLICATIONS

Ababsa, F et al., "Robust camera pose estimation using 2D fiducials tracking for real-time augmented reality systems," in ACM SIGGRAPH VRCAI, 2004, pp. 431-435.*
Kato, H., et al. Marker Tracking and HMD Calibration for a Video-based Augmented Reality Conferencing System, Proceedings of the 2nd IEEE and ACM International Workshop on Augmented Reality \ '99, pp. 85-94, 1999.*

* cited by examiner

*Primary Examiner* — Maurice L McDowell, Jr.
*Assistant Examiner* — Donna Ricks
(74) *Attorney, Agent, or Firm* — Jianq Chyun IP Office (57) ABSTRACT

A method, a system, and a computer program product for providing augmented reality based on marker tracking are provided. In the method, an image is captured by an image capturing unit, and whether a quadrangle is present in the image is determined. If the quadrangle is found in the image, whether the quadrangle is a marker that complies with a marker definition is determined. If the quadrangle is the marker, an identity of the marker and four vertice coordinates of a marker image are identified. A rotation state of the marker is determined according to the vertex coordinates of the marker image, and a relative displacement between the marker and the image capturing unit is calculated. A three-dimensional object is combined into the image according to the relative displacement, the rotation state, and the identity of the marker, so as to provide an augmented reality image.

18 Claims, 7 Drawing Sheets

METHOD AND SYSTEM FOR PROVIDING AUGMENTED REALITY BASED ON MARKER TRACKING, AND NON-TRANSITORY COMPUTER-READABLE MEDIUM THEREOF

CROSS-REFERENCE TO RELATED APPLICATION

This application claims the priority benefit of Taiwan application serial no. 98145639, filed on Dec. 29, 2009. The entirety of the above-mentioned patent application is hereby incorporated by reference herein and made a part of this specification.

BACKGROUND OF THE INVENTION

1. Field of the Invention

The invention relates to a method, a system, and a computer program product of providing augmented reality (AR), and more particularly, to a method, a system, and a computer program product providing AR based on marker tracking techniques utilizing edge detection.

2. Description of Related Art

Augmented reality (AR) technology allows a person to see or otherwise sense a computer-generated virtual world integrated with the real world. With the help of AR technology, a user's current perception of reality can be enhanced when the user interacts with the virtual object. Tracking techniques are essential to determine whether AR can accurately overlay the virtual object or information over the real world.

Common tracking techniques can be divided into sensor-based techniques and vision-based techniques. The sensor-based tracking techniques require additional installation of particular hardware devices such as magnetic, acoustic, inertial, optical and mechanical sensors, and thus are more costly. On the contrary, the vision-based tracking techniques use conventional cameras as sensors and require lower costs.

The objects tracked by applying the tracking techniques include artificial markers and random pictures with distinguishable features. The properties of the so-called artificial markers, e.g. shapes, sizes, and colors of the markers, have to be well defined in advance, and thereby the markers can be easily tracked in a complicated environment. By contrast, when the random pictures with distinguishable features act as the objects to be tracked, the random pictures are not strictly limited to be in a specific form, so as to achieve various AR effects. However, in such case, the system providing AR requires high volume of computation and is relatively weak.

SUMMARY OF THE INVENTION

The invention is directed to a method of providing augmented reality (AR) based on marker tracking techniques. This method is capable of accurately tracking a marker in an image under an environment with large brightness variation, so as to provide an AR image.

The invention is directed to a system for providing AR. The system is capable of tracking a marker efficiently in a complicated environment and generating an AR image by combining a three-dimensional (3D) object.

The invention is directed to a computer program product that is capable of allowing a computer system to require the marker tracking ability to achieve AR as said computer program are loaded into the computer system.

The invention is directed to a method of providing AR based on marker tracking techniques. In this method, an image is captured by an image capturing unit, and whether a quadrangle is present in the image is determined. When the quadrangle is found in the image, it is determined whether the quadrangle is a marker in accordance with a marker definition. When the quadrangle is determined to be the desired marker, an identity of the marker and an order of vertex coordinates of a marker image are identified. In addition, a rotation state of the marker is also determined according to the vertex coordinates of the marker image, and a relative displacement between the marker and the image capturing unit is calculated. A 3D object is combined to the image according to the relative displacement, the rotation state, and the identity of the marker to generate an AR image.

From another perspective, the invention is directed to a system providing AR. This system includes an image capturing unit, a quadrangle detecting unit, a marker identifying unit, a marker feature capturing unit, and an image integrating unit. The image capturing unit is configured to capture an image. The quadrangle detecting unit coupled to the image capturing unit determines whether a quadrangle is present in the image. The marker identifying unit coupled to the quadrangle detecting unit determines whether the quadrangle is a marker in accordance with a marker definition when the quadrangle is found in the image and identifies an identity of the marker and an order of vertex coordinates of a marker image after the quadrangle is determined to be the desired marker. The marker feature capturing unit coupled to the marker identifying unit determines a rotation state of the marker according to the vertex coordinates of the marker image and calculates a relative displacement between the marker and the image capturing unit. The image integrating unit coupled to the marker feature capturing unit combines a 3D object to the image according to the relative displacement, the rotation state, and the identity of the marker to generate an AR image.

From still another aspect, the invention is directed to a computer program product. After at least one program instruction recorded in the computer program product is loaded into a computer system and executed, following steps are performed. After an image is captured by an image capturing unit, whether a quadrangle is present in the image is determined. When the quadrangle is found in the image, whether the quadrangle is a marker in accordance with a marker definition is determined. When the quadrangle is determined to be the marker, an order of four vertex coordinates of a marker image is also determined, and an identity of the marker is identified. A rotation state of the marker is determined according to the vertex coordinates of the marker image, and a relative displacement between the marker and the image capturing unit is calculated. A 3D object is combined to the image according to the relative displacement, the rotation state, and the identity of the marker to generate an AR image.

In light of the foregoing, the invention determines whether a marker in accordance with the marker definition is present in the image based on edge detection. Moreover, the identity of the marker and the rotation state and location thereof in the 3D space are obtained so as to combine the 3D object suitably into the image. Accordingly, the invention allows the user to experience the interaction with the virtual 3D object while interacting with the marker, so as to achieve AR.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated

DESCRIPTION OF EMBODIMENTS

Figure 1:
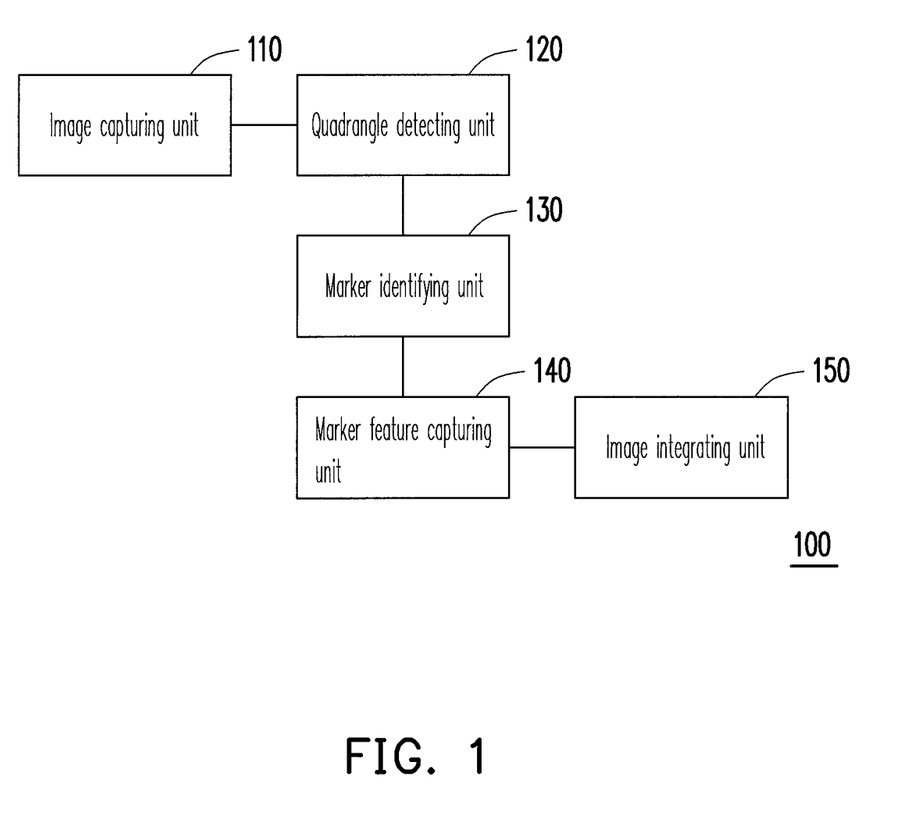
FIG. 1 is a block diagram illustrating a system of providing AR according to an embodiment of the invention.

FIG. 1 is a block diagram illustrating a system of providing AR according to an embodiment of the invention. Referring to FIG. 1, a system 100 for providing AR includes an image capturing unit 110, a quadrangle detecting unit 120, a marker identifying unit 130, a marker feature capturing unit 140, and an image integrating unit 150. In the present embodiment, the system 100 is vision-based and tracks a marker in accordance with a particular marker definition, so as to overlay a virtual 3D object or information over a real world image by tracking the marker. Thereby, a user's perception of reality can be augmented.

The image capturing unit 110 is, for example, a universal serial bus (USB) video camera or any other filming device having the ability to capture images. The quadrangle detecting unit 120 is coupled to the image capturing unit 110. The marker identifying unit 130 is coupled to the quadrangle detecting unit 120 and the marker feature capturing unit 140, respectively. The marker feature capturing unit 140 is coupled to the image integrating unit 150. Here, the quadrangle detecting unit 120, the marker identifying unit 130, and the marker feature capturing unit 140 could be a software component, a hardware having computational processing ability, or a combination thereof. The image integrating unit 150 includes a drawing engine and an object database recording a plurality of 3D objects. In the present embodiment, the system 100 further includes a display unit (not shown) configured to display an AR image generated by the image integrating unit 150.

Figure 2:
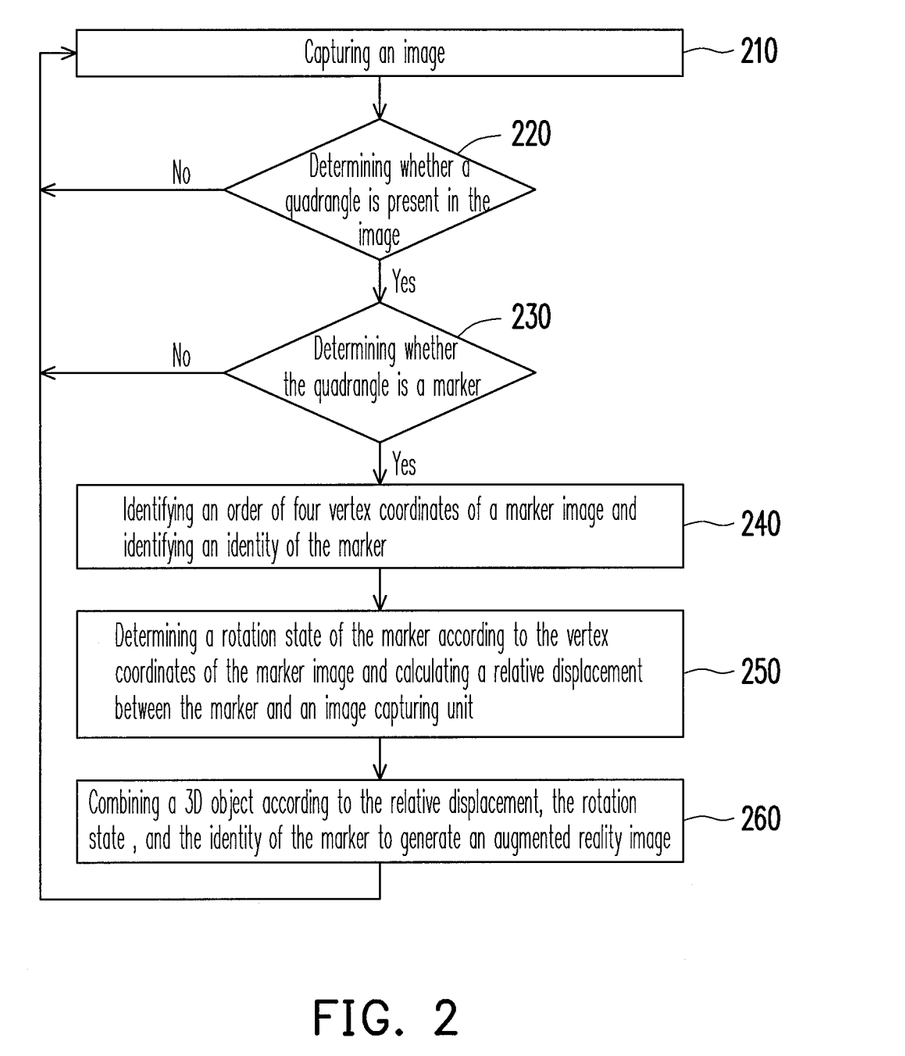
FIG. 2 is a flowchart illustrating a method of providing AR based on marker tracking according to an embodiment of the invention.

In the following embodiment, an operating process of the system 100 is further illustrated in detail with the accompanying figure. FIG. 2 is a flowchart illustrating a method of providing augmented reality based on marker tracking according to an embodiment of the invention. As shown in FIG. 1 and FIG. 2 simultaneously, the image capturing unit 110 captures a real world image in step 210.

In the present embodiment, the object tracked by the system 100 has a square marker. However, when the image capturing unit 110 captures an image containing the marker, the marker in the image may have a shape different from a square (such as a trapezoid or a rhombus) depending on an angle of the marker held by the user. Regardless of the changes in angle, the marker always has a quadrangle shape in the image. As described in step 220, in order to track the marker, the quadrangle detecting unit 120 first determines whether a quadrangle is present in the image.

The quadrangle detecting unit 120 converts the image into a grayscale image, performs a mask computation on the grayscale image based on edge detection to acquire a plurality of edge pixels in the image, and calculates a corresponding direction of each of the edge pixels. For example, the quadrangle detecting unit 120 performs a convolution mask computation on the grayscale image to respectively acquire a first responsive value and a second responsive value of each pixel in the grayscale image. In the present embodiment, a first responsive value $R_x$ and a second responsive value $R_y$ of a pixel (x,y) are calculated using the following equation:

$$R_x = \begin{bmatrix} -1 & -2 & -1 \\ 0 & 0 & 0 \\ 1 & 2 & 1 \end{bmatrix} * G, \; R_y = \begin{bmatrix} -1 & 0 & 1 \\ -2 & 0 & 2 \\ -1 & 0 & 1 \end{bmatrix} * G$$

Here, G is a nine-grid of pixels in the grayscale image, and the pixel (x,y) is in the center of the nine-grid of pixels. In the grayscale image, except for the pixels in a peripheral area of the grayscale image, the first responsive values and the second responsive values of the remaining pixels can all be calculated using the above equation. The quadrangle detecting unit 120 then determines the pixel to be an edge pixel as long as the sum of absolute values of the first responsive value and the second responsive value of each pixel is larger than a predetermined value. Accordingly, even if the image capturing unit 110 has captured the image in an environment with large brightness variation, the quadrangle detecting unit 120 is capable of identifying the edge pixels in the image through the aforementioned steps.

In addition, the quadrangle detecting unit 120 defines a corresponding direction of the pixel according to the first responsive value and the second responsive value of the pixel. In the present embodiment, a corresponding direction $\beta(x,y)$ of the edge pixel (x,y) is calculated using the following equation:

$$\beta(x, y) = \begin{cases} \arctan\left(\frac{R_y}{R_X}\right), & R_X > 0, R_y \geq 0 \\ \arctan\left(\frac{R_y}{R_X}\right) + \pi, & R_X < 0 \\ \arctan\left(\frac{R_y}{R_X}\right) + 2\pi, & R_X > 0, R_y < 0 \\ \frac{1}{2}\pi, & R_X = 0, R_y \geq 0 \\ \frac{3}{2}\pi, & R_X = 0, R_y < 0 \end{cases}$$

Here, the direction $\beta(x,y)$ is in units of radiuses.

Since the edge pixel acquired by applying the above method constitutes a fairly wide edge line in the image, in order to increase accuracy of detection results, the quadrangle detecting unit 120 further defines a portion of the edge pixels as skeleton pixels according to relative positions of the edge pixels. Specifically, when the quadrangle detecting unit 120 scans the pixels in the image individually along a scanning direction, this edge pixel is defined as a starting point when the scanned pixel is changed from a non-edge pixel to an edge pixel. Thereafter, when the scanned pixel is changed from the edge pixel to the non-edge pixel, this non-edge pixel is defined as an endpoint. When a distance between the starting point and the endpoint is smaller than a specific value, the quadrangle detecting unit 120 defines the pixel at a midpoint of the starting point and the endpoint as a skeleton pixel.

Figure 3:
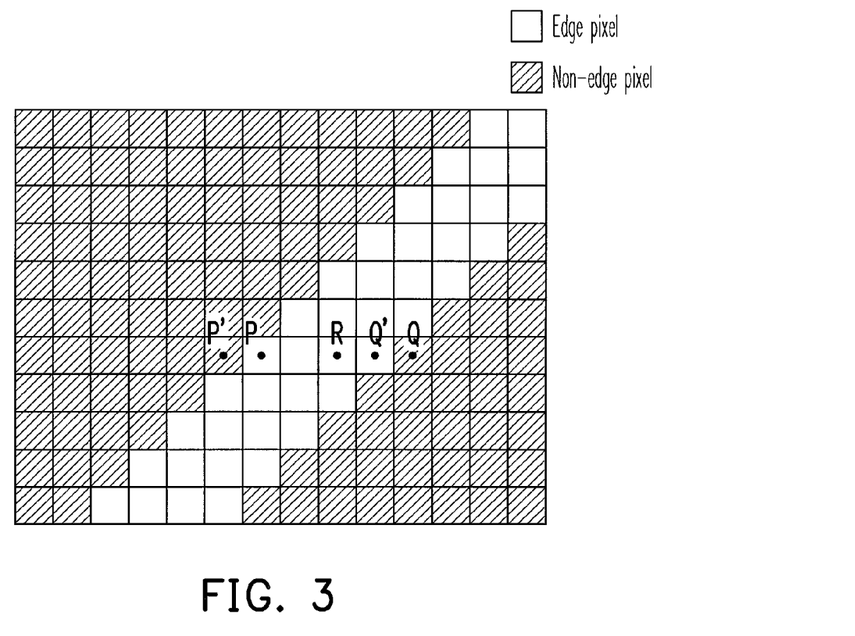
FIG. 3 is a schematic view illustrating a portion of an image after edge detection is conducted according to an embodiment of the invention.

FIG. 3 is a schematic view illustrating a portion of an image after edge detection is conducted according to an embodiment of the invention. In FIG. 3, the shadowed regions represent non-edge pixels while the remaining regions represent edge pixels. Here, it is assumed that the quadrangle detecting unit 120 scans the pixels in the image individually along a horizontal scanning direction. When the scanning of the quadrangle detecting unit 120 is shifted from a pixel P' to a pixel P, since the pixel P' is the non-edge pixel and the pixel P is the edge pixel, the pixel P is then marked as the starting point. When the scanning of the quadrangle detecting unit 120 is shifted from a pixel Q' to a pixel Q, since the pixel Q' is the edge pixel and the pixel Q is the non-edge pixel, the pixel Q is then marked as the endpoint. Given a distance between the pixel P and the pixel Q is smaller than a specific value, the quadrangle detecting unit 120 then defines a midpoint pixel R of the pixel P and the pixel Q as the skeleton pixel.

The quadrangle detecting unit 120 scans the image individually along the horizontal scanning direction and a vertical scanning direction, so as to further define a plurality of skeleton pixels. In other embodiments, the quadrangle detecting unit 120 scans the image along other different directions, and the invention is not limited thereto.

After defining the edge pixels and the skeleton pixels in the image, the quadrangle detecting unit 120 re-scans the image according to a specific order. For instance, the quadrangle detecting unit 120 scans the image horizontally with an interval of three pixels (however, the number of pixels of the interval is not limited thereto) rather than scans every line in the image, thereby increasing the processing rate. Once the skeleton pixel is scanned, the quadrangle detecting unit 120 determines this skeleton pixel as the starting point for searching the quadrangle and determines whether the scanning direction is changed five times during the process of continuously acquiring another skeleton pixel or edge pixel.

Figure 4:
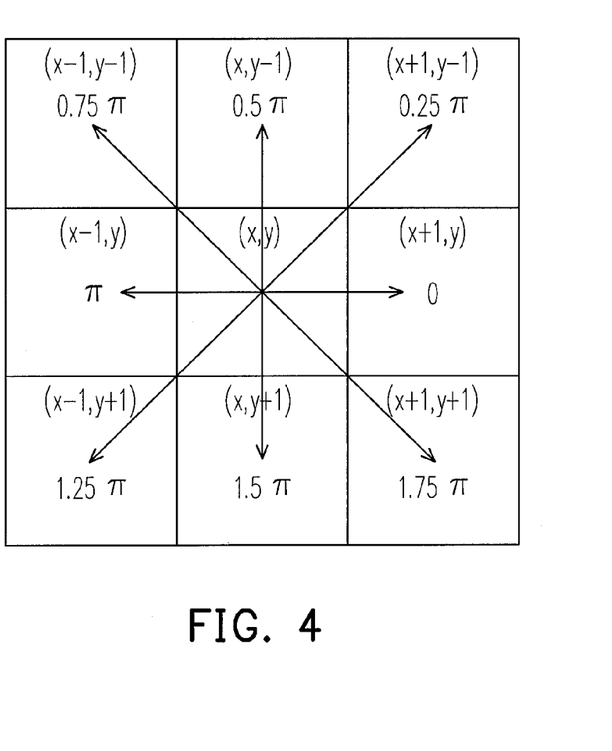
FIG. 4 is a schematic view showing a scanned pixel and moving directions according to an embodiment of the invention.

A method of the quadrangle detecting unit 120 acquiring another skeleton pixel or edge pixel in the scanning process is illustrated in detail. As depicted in FIG. 4, given the pixel (x,y) is the pixel which is being scanned (referred to as the scanned pixel hereinafter), the quadrangle detecting unit 120 has eight possible moving directions when acquiring another scanned pixel. In the present embodiment, radius values corresponding to these eight moving directions are defined respectively as $0$, $0.25\pi$, $0.5\pi$, $0.75\pi$, $\pi$, $1.25\pi$, $1.5\pi$, and $1.75\pi$.

The quadrangle detecting unit 120 first acquires a first acquiring direction closest to the corresponding direction of the scanned pixel from the eight moving directions. When a first examining pixel closest to the scanned pixel along the first acquiring direction in the image is determined as the skeleton pixel, the quadrangle detecting unit 120 then determines the first examining pixel as the latest scanned pixel. When the first examining pixel is not determined as the skeleton pixel, the quadrangle detecting unit 120 then acquires a second acquiring direction second closest to the corresponding direction of the scanned pixel from the eight moving directions.

When a second examining pixel closest to the scanned pixel along the second acquiring direction in the image is determined to be the skeleton pixel, the quadrangle detecting unit 120 then determines the second examining pixel as the latest scanned pixel. When the second examining pixel is not determined to be the skeleton pixel, the quadrangle detecting unit 120 then acquires a third acquiring direction third closest to the corresponding direction of the scanned pixel from the eight moving directions.

When a third examining pixel closest to the scanned pixel along the third acquiring direction in the image is determined to be the skeleton pixel, the quadrangle detecting unit 120 determines the third examining pixel as the latest scanned pixel. When the third examining pixel is not determined to be the skeleton pixel, the quadrangle detecting unit 120 determines the edge pixel (but not the skeleton pixel) as the basis for determining the movement.

In detail, the quadrangle detecting unit 120 re-determines whether the first examining pixel is the edge pixel. When the first examining pixel is determined to be the edge pixel, the first examining pixel is determined as the latest scanned pixel. When the first examining pixel is not determined to be the edge pixel, the quadrangle detecting unit 120 determines the second examining pixel as the latest scanned pixel when the second examining pixel is determined to be the edge pixel. When the second examining pixel is not determined to be the edge pixel, the quadrangle detecting unit 120 determines the third examining pixel as the latest scanned pixel when the third examining pixel is determined to be the edge pixel.

Nevertheless, when the third examining pixel is not determined to be the edge pixel, the quadrangle detecting unit 120 then determines that no other skeleton pixel or edge pixel can be currently acquired as the latest scanned pixel. Up to this point, the quadrangle detecting unit 120 stops scanning, returns to the skeleton pixel acting as the starting point for searching the quadrangle, scans the image again according to the specific order, and repeats the steps above when another skeleton pixel is scanned.

In the present embodiment, if a difference between the corresponding direction of the scanned pixel and a certain moving direction ranges from $0$ to $0.125\pi$, the moving direction is then closest to the corresponding direction of the scanned pixel. When the difference ranges from $0.125\pi$ to $0.25\pi$, the moving direction is then second closest to the corresponding direction of the scanned pixel in the eight moving directions. When the difference ranges from $0.25\pi$ to $0.325\pi$, the moving direction is third closest to the corresponding direction of the scanned pixel.

When the quadrangle detecting unit 120 is capable of acquiring another skeleton pixel or edge pixel continuously as the latest scanned pixel, the quadrangle detecting unit 120 then records the corresponding direction of the scanned pixel in a buffer array every time as a new scanned pixel is acquired. This buffer array is, for example, a circular queue with a size of n (where n is a positive integer), and when the buffer array is full, the quadrangle detecting unit 120 replaces an earliest data in the queue with the corresponding direction of the scanned pixel.

When a difference between the corresponding direction of the scanned pixel and the earliest direction recorded in the buffer array is larger than a radius threshold value, the quadrangle detecting unit 120 defines the scanned pixel as a corner point. When a previously scanned pixel is not the corner point but the scanned pixel is the corner point, the quadrangle detecting unit 120 defines the corresponding pixel of the earliest direction recorded in the buffer array as an end-endpoint. When the previously scanned pixel is the corner point, but the scanned pixel is not the corner point, the quadrangle detecting unit 120 defines the scanned pixel as a start-endpoint.

Once a set of the end-endpoint and the start-endpoint is defined, this indicates that the quadrangle detecting unit 120 has changed the scanning direction once in the scanning process. When locations of the end-endpoint defined at the first time and the end-endpoint defined at the fifth time are within an error range, the quadrangle detecting unit 120 then determines that the scanning direction has been changed five times in the process of continuously acquiring another skeleton pixel or edge pixel. At this time, the quadrangle detecting unit 120 determines the quadrangle to be present in the image. Thereafter, the quadrangle detecting unit 120 calculates the four vertex coordinates of the quadrangle sequentially by utilizing four sets of the end-endpoint and the start-endpoint defined from the first time to the fourth time.

Figure 5:
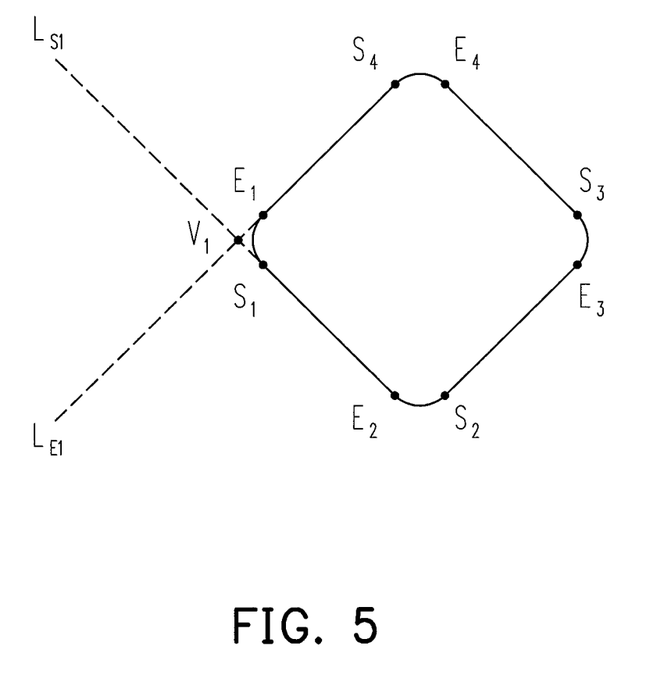
FIG. 5 is a schematic view illustrating four sets of end-endpoints and start-endpoints according to an embodiment of the invention.

FIG. 5 is a schematic view illustrating four sets of the end-endpoint and the start-endpoint defined by the quadrangle detecting unit 120 in the process of scanning the image according to an embodiment of the invention. As shown in FIG. 5, it is assumed that the pixels defined by the quadrangle detecting unit 120 as the end-endpoints or the start-endpoints are sequentially an end-endpoint $E_1$, a start-endpoint $S_1$, an end-endpoint $E_2$, a start-endpoint $S_2$, an end-endpoint $E_3$, a start-endpoint $S_3$, an end-endpoint $E_4$, a start-endpoint $S_4$. When calculating the vertex coordinates of the quadrangle, the quadrangle detecting unit 120 acquires the neighboring end-endpoint and start-endpoint according to an order that the pixels are defined (for example, the end-endpoint $E_1$ and the start-endpoint $S_1$ are first acquired). An extension line $L_{E1}$ formed by the end-endpoint $E_1$ and the start-endpoint $S_4$ and an extension line $L_{S1}$ formed by the start-endpoint $S_1$ and the end-endpoint $F_2$ are then acquired. An intersection $V_1$ formed by the extension line $L_{E1}$ and the extension line $L_{S1}$ then serves as the first vertex coordinates of the quadrangle. The second, the third, and the fourth vertex coordinates of the quadrangle are sequentially determined based on the other three sets of the end-endpoint and the start-endpoint.

Next, referring to step 230 in FIG. 2, the marker identifying unit 130 determines whether the detected quadrangle is the marker in accordance with the marker definition. In the present embodiment, the so-called marker definition includes a layout prototype. Before determining whether a color layout in the quadrangle complies with the layout prototype, the marker identifying unit 130 needs to normalize the shape and the grayscale value of the quadrangle. In detail, the marker identifying unit 130 first defines four vertex coordinates of a square image according to a predetermined length. Here, the predetermined length is a side length of the square image. If the predetermined length is assumed to be S, then the four vertex coordinates of the square image are sequentially defined as (0,0), (0,S), (S,S), and (S,0) from the upper-left corner in a counter-clockwise manner.

Afterwards, the marker identifying unit 130 finds out a pixel corresponding relationship between the grayscale image and the square image according to the four vertex coordinates of the quadrangle and the vertex coordinates of the square image, so as to generate the square image by referring to the grayscale image. Furthermore, the pixel corresponding relationship refers to each pixel position in the grayscale image corresponding to each pixel in the square image. In the present embodiment, the marker identifying unit 130 first defines a model of the pixel corresponding relationship as follows:

$$\begin{bmatrix} hx \\ hy \\ h \end{bmatrix} = \begin{bmatrix} P_1 & P_2 & P_3 \\ P_4 & P_5 & P_6 \\ P_7 & P_8 & 1 \end{bmatrix} \begin{bmatrix} x_n \\ y_n \\ 1 \end{bmatrix}$$

Here, (x,y) is the pixel position in the grayscale image, $(x_n, y_n)$ is a pixel position in the square image, and h and $P_1$ to $P_8$ are variables. Since h equals $P_7 x_n + P_8 y_n + 1$, the model of the pixel corresponding relationship can be changed as follows:

$$x = \frac{P_1 x_n + P_2 y_n + P_3}{P_7 x_n + P_8 y_n + 1}, y = \frac{P_4 x_n + P_5 y_n + P_6}{P_7 x_n + P_8 y_n + 1}$$

Given the vertex coordinates of the quadrangle are sequentially $(x_1,y_1)$, $(x_2,y_2)$, $(x_3,y_3)$, $(x_4,y_4)$, all of the variables can be acquired by deeming the vertex coordinates (0,0) of the square image and the vertex coordinates $(x_1,y_1)$ of the quadrangle as a set and substituting the set into the above equation, deeming the vertex coordinates (0,S) of the square image and the vertex coordinates $(x_2,y_2)$ of the quadrangle as a set and substituting the set into the above equation, deeming the vertex coordinates (S,S) of the square image and the vertex coordinates $(x_3,y_3)$ of the quadrangle as a set and substituting the set into the above equation, and deeming the vertex coordinates (S,0) of the square image and the vertex coordinates $(x_4,y_4)$ of the quadrangle as a set and substituting the set into the above equation, so as to create the pixel corresponding relationship of the grayscale image and the square image. The pixel corresponding relationship refers to each pixel position in the grayscale image corresponding to each pixel in the square image, such that the square image is generated by referring to the grayscale value.

Figure 6:
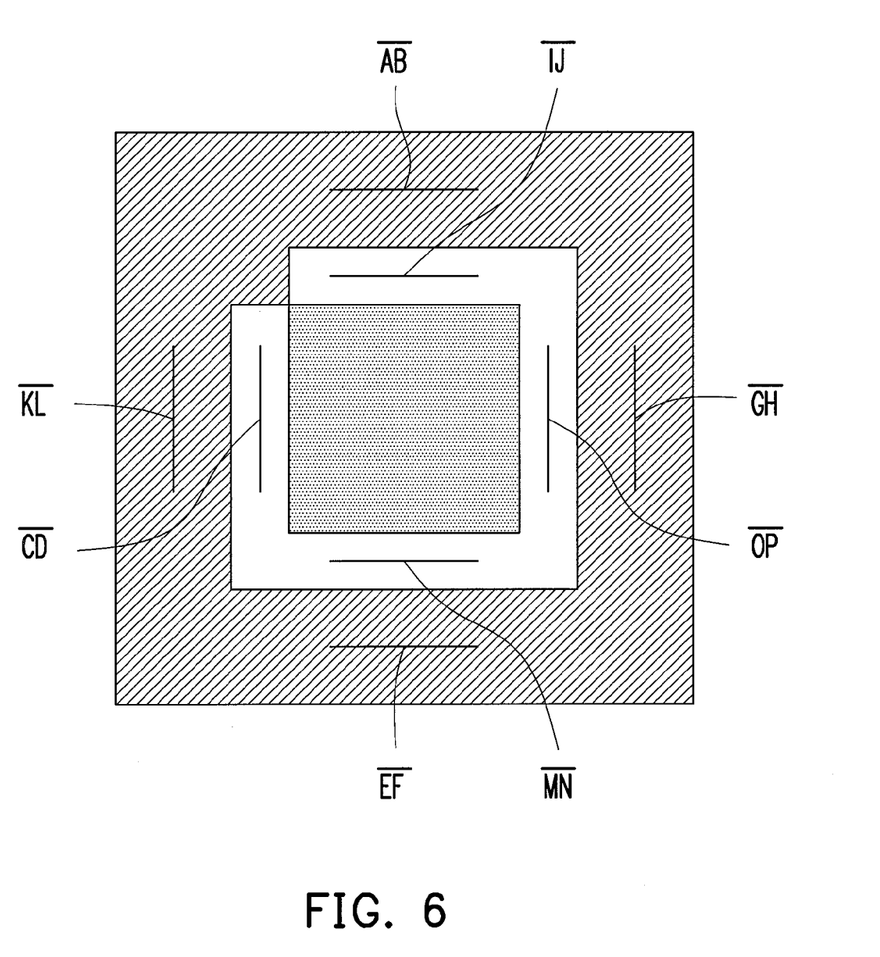
FIG. 6 is a schematic view illustrating a square image according to an embodiment of the invention.

In the present embodiment, each target tracked by the system 100 has a square marker in the color of black or white. Hence, the marker identifying unit 130 normalizes not only the shape but also the grayscale values of the square image. Specifically, the marker identifying unit 130 defines a grayscale threshold value based on pixel values of a plurality of specific positions in the square image, and the marker identifying unit 130 then converts the square image into a monochrome (black and white) binary image according to the grayscale threshold value. FIG. 6 is a schematic view illustrating the square image according to an embodiment of the invention. In the present embodiment, the specific positions refer to all of the pixels located on a segment $\overline{AB}$, a segmen $\overline{CD}$, a segmen $\overline{EF}$, a segmen $\overline{GH}$, a segmen $\overline{IJ}$, a segmen $\overline{KL}$, a segment $\overline{MN}$, and a segment $\overline{OP}$. The marker identifying unit 130 defines an average of the pixel values of these pixels as the grayscale threshold value. In the square image, when the pixel value of a pixel position is smaller than the grayscale threshold value, a corresponding pixel position in the monochrome binary image is then marked as 0 (black); otherwise, the corresponding pixel position is marked as 1 (white).

Figure 7:
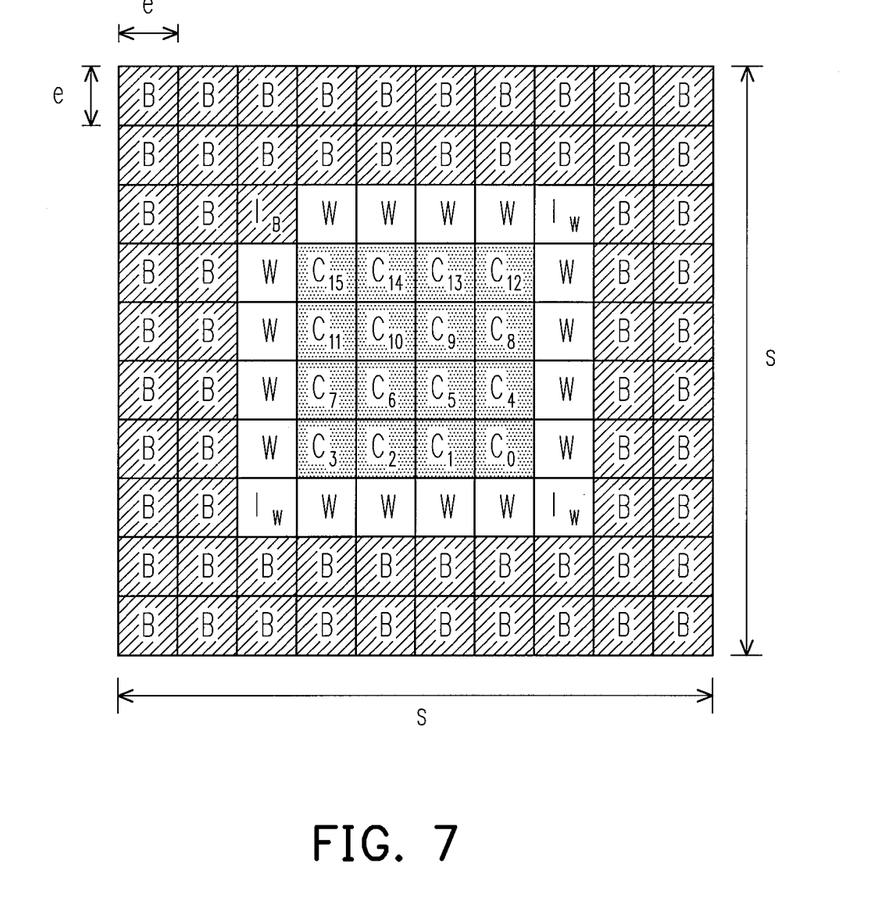
FIG. 7 is a schematic view illustrating a marker in accordance with a layout prototype in a marker definition according to an embodiment of the invention.

Next, it is determined whether the binary image whose shape and grayscale value are normalized is the marker. FIG. 7 illustrates the layout prototype in the marker definition. As indicated in FIG. 7, the marker in accordance with the marker definition is constituted by 10×10 color blocks, and a length of each color block is e pixels. In FIG. 7, the color block marked as "B" indicates all of the pixels in the color block have to be in black, and the color block marked as "W" indicates all of the pixels in the color block have to be in white. The sixteen color blocks located in the center of the marker and marked as "$C_0$" to "$C_{15}$" are black or white color blocks. These sixteen color blocks can constitute different patterns to represent different markers with the variation in color and arrangement. In addition, the four color blocks marked respectively as "$I_B$" and "$I_W$" are configured to locate the direction of the marker. Here, all of the pixels in the color block marked as "$I_B$" have to be in black and located on the upper-left corner of the marker. Moreover, all of the pixels in three color blocks marked as "$I_W$" have to be in white. In other words, in the four color blocks configured to locate the direction of the marker, only one of the color blocks is the black color block while the remaining three color blocks have to be white color blocks.

When determining whether the quadrangle in the image is the marker in accordance with the marker definition, the marker identifying unit 130 determines whether the monochrome binary image is consistence with the layout prototype as shown in FIG. 7. Accordingly, the marker identifying unit 130 first divides the monochrome binary image into a plurality of color blocks according to a predetermined dimension, and the predetermined dimension is a size (exe pixels) of each color block in the marker definition. Thereafter, the marker identifying unit 130 acquires pixel values of four index positions in the monochrome binary image. In the present embodiment, the four index positions are (2.5e,2.5e), (2.5e, s-2.5e), (s-2.5e,s-2.5e), and (s-2.5e,2.5e) respectively and correspond to central pixel positions of the four color blocks configured to locate the direction of the marker. The marker identifying unit 130 only determines the quadrangle to be the marker when the layout of the color blocks complies with the layout prototype and the pixel values in only one index position of the four index positions are in black. In other words, if no pixel value of the four index positions is in black, or if the pixels values of more than one index position are in black, the marker identifying unit 130 does not determine the quadrangle to be the marker.

As the quadrangle in the image is determined to be the marker, the marker identifying unit 130 then defines the order of the four vertex coordinates of the marker image and identifies the identity of the marker as shown in step 240. In particular, the rotation angle of the marker represented in the captured image affects the order of finding the vertices, so as to generate the monochrome binary image with different rotational directions. However, the marker has to be identified as the same marker regardless of the rotation angles. Therefore, in order to unify the rotation angles of the marker, after acquiring the position of the only black pixel from the four index positions, the marker identifying unit 130 determines the color block of the acquired index position to be the $I_B$ color block, defines the vertex coordinates of the square image closest to the $I_B$ color block as vertex coordinates a(0,0) on the upper-left corner of the marker, and defines vertex coordinates b(0,s), c(s,s), and d(s,0) of the marker image in a counter-clockwise manner.

The marker identifying unit 130 further acquires several central color blocks from all of the color blocks according to the layout prototype and calculates the pixel value at a central position of each central color block to indicate the identity of the marker. In the present embodiment, an identity of a marker $M_c$ is calculated with the following equation:

$$M_c = \sum_{i=0}^{15} c_i 2^i$$

Here, $c_i$ is the pixel value at the central position of one of the central color blocks. In the present embodiment, the pattern of the marker alters with the variations in the color and arrangement of the central color blocks. Consequently, the identity of the marker $M_c$ calculated correspondingly also has different values.

The marker feature capturing unit 140 determines the rotation state of the marker according to the vertex coordinates of the marker image and calculates a relative displacement between the marker and the image capturing unit 110 in step 250.

Figure 8:
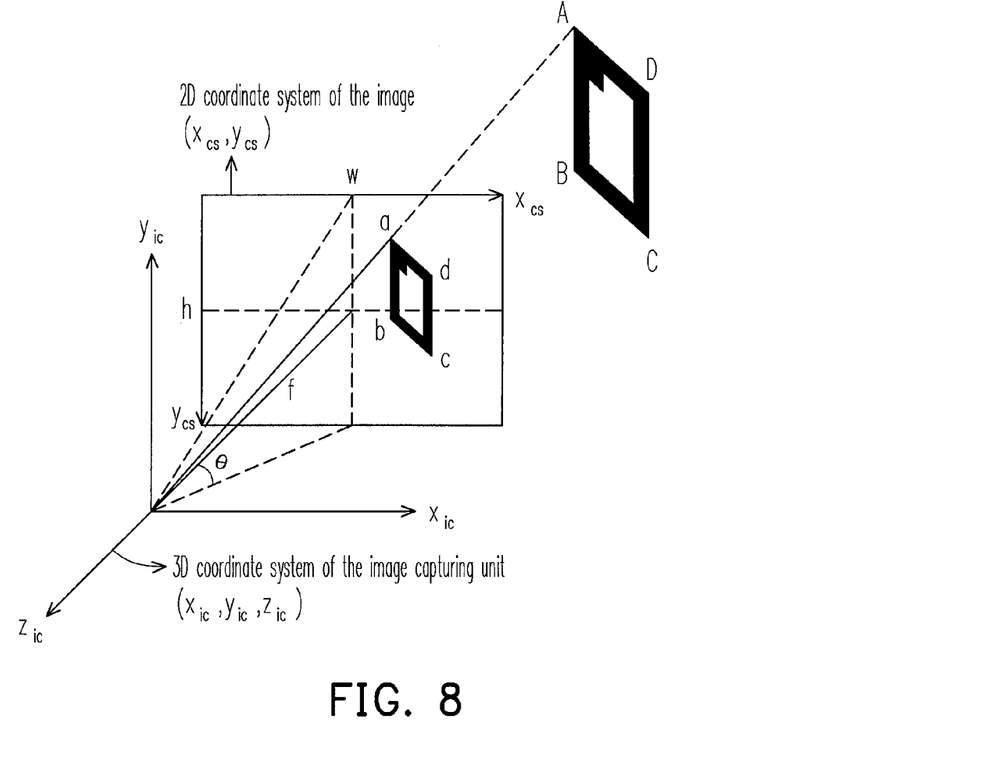
FIG. 8 is a schematic view illustrating a 3D coordinate system of an image capturing unit and a 2D coordinate system of an image according to an embodiment of the invention.

The determination of the rotation state of the marker by the marker feature capturing unit 140 is illustrated below. FIG. 8 is a schematic view illustrating a 3D coordinate system of the image capturing unit 110 and a two-dimensional (2D) coordinate system of the image according to an embodiment of the invention. In the present embodiment, the 3D coordinate system and the 2D coordinate system have different dimensions, different positions of the origins, and different units. The 3D coordinate system of the image capturing unit 110 is in units of millimeters (mm) while the 2D coordinate system of the image is in units of pixels. As depicted in FIG. 8, w and h respectively indicate a width and a height of the captured image, 0 is half of a perpendicular viewing angle of the image capturing unit 110, and f represents a distance from the center of the image capturing unit 110 to a photosensitive plane thereof (in other words, the focal length). Since the focal length is in units of mm, the focal length is represented as $f_{mm}$ below.

In the present embodiment, the marker feature capturing unit 140 first defines a coordinate corresponding relationship of the 3D coordinate system of the image capturing unit 110 and the 2D coordinate system of the image, converts the four vertex coordinates of the marker image into four 3D vertex coordinates of the marker image, and creates four vectors according to the 3D vertex coordinates of the marker image, so as to form a rotation matrix using the vectors to indicate the rotation state of the marker.

In detail, the marker feature capturing unit 140 calculates a focal length $f_p$ in units of pixels by utilizing the following equation:

$$f_p = \frac{h}{2\tan\theta}$$

Next, in order to convert a random point $p(x_{cs},y_{cs})$ in the 2D coordinate system of the image into a coordinate point $(x_{ic}, y_{ic}, z_{ic})$ in the 3D coordinate system of the image capturing unit 110, the marker feature capturing unit 140 adopts the following equation:

$$p(x_{ic}, y_{ic}, z_{ic}) = p\left(\frac{f_{mm}}{f_p}\left(x_{cs} - \frac{w}{2}\right), -\frac{f_{mm}}{f_p}\left(y_{cs} - \frac{w}{2}\right), -f_{mm}\right)$$

It is assumed that the four vertex coordinates of the marker image originally in the 2D coordinate system of the image are converted into 3D vertex coordinates $(x_a,y_a,z_a)$, $(x_b,y_b,z_b)$, $(x_c,y_c,z_c)$, and $(x_d,y_d,z_d)$ of the marker image after being converted through the above equation. The marker feature capturing unit 140 first defines a vector a as $[x_a\ y_a\ z_a]$, a vector b as $[x_b\ y_b\ z_b]$, a vector c as $[x_c\ y_c\ z_c]$, and a vector d as $[x_d\ y_d\ z_d]$. The marker feature capturing unit 140 defines a vector x1 as a cross product of the vector d and the vector a, a vector x2 as a cross product of the vector b and the vector c, a vector y1 as a cross product of the vector a and the vector b, and a vector y2 as a cross product of the vector c and the vector d.

It is assumed that a vector x is a unit vector of a cross product of the vector x1 and the vector x2, a vector y is a unit vector of a cross product of the vector y1 and the vector y2, and a vector z is a unit vector of a cross product of the vector x and the vector y. The marker feature capturing unit 140 then defines the rotation matrix representing the rotation state of the marker as $[x^t\ y^t\ z^t]$.

Nevertheless, the vector x and the vector y defined by the above method may not be perpendicular to each other when an error has occurred during image processing. Thus, the marker feature capturing unit 140 additionally defines a compensation vector to solve this problem. More specifically, the marker feature capturing unit 140 defines a vector m as a unit vector of a sum vector of the vector x and the vector y, and defines a vector l and a vector r by means of the following equation:

$$l = \frac{m \times z}{|m \times z|},\ r = \frac{z \times m}{|z \times m|}$$

Accordingly, the marker feature capturing unit 140 defines two compensation vectors that must be perpendicular to each other, and a compensation vector $x_{com}$ and a compensation vector $y_{com}$ are defined by the following equation:

$$x_{com} = \frac{m \times l}{|m \times l|},\ y_{com} = \frac{m \times r}{|m \times r|}$$

The marker feature capturing unit 140 defines $[X_{com}{}^t\ y_{com}{}^t\ z^t]$ as the rotation matrix representing the rotation state of the marker.

Furthermore, in order to calculate the relative displacement of the marker and the image capturing unit 110, the marker feature capturing unit 140 selects two vertices that are diagonal to each other from four vertices of the marker, and the marker feature capturing unit 140 acquires two projection points of the two diagonal vertices on a plane of the 3D coordinate system to calculate two auxiliary segments constituted by projecting the two projection points to a specific axis of the plane, so as to calculate a target segment using the two auxiliary segments. After coordinates of an intersection between two diagonal lines constituted by the four vertex coordinates of the marker image in the 3D coordinate system are acquired, the relative displacement is calculated according to the coordinates of the intersection and the target segment.

Figure 9:
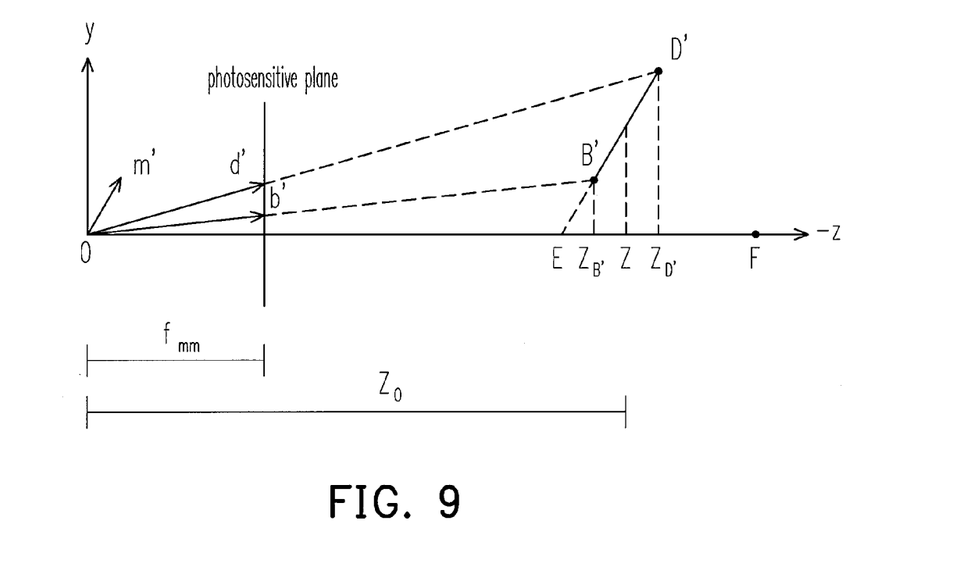
FIG. 9 illustrates correlations between information required for calculating a relative displacement according to an embodiment of the invention.

In the present embodiment, the marker feature capturing unit 140 selects the y-z plane in the 3D coordinate system, and the z axis is defined as the specific axis. As the marker and the image capturing unit 110 are located in the same 3D space, the coordinates of the vertices of the marker can be acquired by the way of measurement when the origin of the 3D coordinate system of the image is at the center of the image capturing unit 110. It is assumed that the vertices of the marker are respectively indicated by A, B, C, and D from the upper-left corner in a counter-clockwise manner. The two vertices selected by the marker feature capturing unit 140 are vertices B and D. FIG. 9 illustrates correlations between information required for calculating a relative displacement according to an embodiment of the invention. As depicted in FIG. 9, vectors m', b', and d' are vectors generated respectively by projecting the vector m, the vector b, and the vector d defined by the marker feature capturing unit 140 to the y-z plane. On the other hand, B' and D' are projection points of the vertices B and D when these vertices are projected to the y-z plane. To calculate the two auxiliary segments, the marker feature capturing unit 140 first calculates ∠FED', ∠FOD', and ∠B'OD' by using an equation for calculating a dot product of vectors:

$$\angle FED' = \arccos \frac{\overrightarrow{OE} \cdot m'}{|\overrightarrow{OE}| \cdot |m'|},$$

$$\angle FOD' = \arccos \frac{\overrightarrow{OE} \cdot d'}{|\overrightarrow{OE}| \cdot |d'|},$$

$$\angle B'OD' = \arccos \frac{b' \cdot d'}{|b'| \cdot |d'|}$$

Next, the marker feature capturing unit 140 calculates a length of a segment $\overline{B'D'}$ by means of the following equation:

$$\overline{B'D'} = \delta_{mm} \frac{|m'|}{|m|}$$

Here, $\delta_{mm}$ is an actual length of the diagonal line in the marker and is in units of mm. Afterwards, lengths of segments $\overline{OD'}$ and $\overline{OB'}$ are calculated by means of the theory of sine functions.

$$\frac{\overline{B'D'}}{\sin\angle B'OD'} = \frac{\overline{OD'}}{\sin\angle OB'D'} = \frac{\overline{OB'}}{\sin\angle OD'B'}$$

Finally, trigonometry is applied to calculate lengths of auxiliary segments $\overline{OZ_{D'}}$ and $\overline{OZ_{B'}}$ as provided below.

$\overline{OZ_D} = \overline{OD'}*\cos \angle EOD'$, $\overline{OZ_B} = \overline{OB'}*\cos \angle EOB'$ In the present embodiment, a length of a target segment $z_o$ (i.e. the segment $\overline{OZ}$) is an average of the two auxiliary segments. It is assumed that the coordinate $(x_i,y_i,x_i)$ is the coordinate of the intersection between the diagonal lines constituted by the four vertex coordinates of the marker image that are converted to the coordinate of the intersection in the 3D coordinate system, the marker feature capturing 140 defines the following equation according to the coordinates of the intersection and the target segment, so as to calculate a relative displacement $(x_{ct},y_{ct},z_{ct})$ of the marker and the image capturing unit 110.

$$(x_{ct},\ y_{ct},\ z_{ct}) = \left(\frac{-z_o}{z_i}x_i,\ \frac{-z_o}{z_i}y_i,\ -z_o\right)$$

It should be noted that in the present embodiment, the relative displacement is calculated based on the y-z plane in the 3D coordinate system and the two vertices B, D of the marker. However, the marker feature capturing unit 140 may also adopt an x-z plane in the 3D coordinate system or the two vertices A, C of the marker to calculate the relative displacement. Furthermore, when selecting the vertices of the marker, the marker feature capturing unit 140 selects the two vertices capable of generating the diagonal lines that are more perpendicular to the z axis of the 3D coordinate system. The marker feature capturing unit 140 then selects a plane capable of generating more projections to perform the computation, so as to reduce estimation errors.

Finally, in step 260, the image integrating unit 150 combines the 3D object to the image according to the relative displacement, the rotation state, and the identity of the marker to generate an AR image, and the image integrating unit 150 utilizes a display unit to display the AR image. For instance, the image integrating unit 150 first selects the 3D object corresponding to the identity of the marker from an object database including a plurality of 3D objects. When combining the 3D object to the image, the image integrating unit 150 adjusts a size of the 3D object in the image according to the relative displacement and adjusts a display angle of the 3D object in the image according to the rotation state of the marker, so as to generate the AR image.

When the image capturing unit 110 captures the image continuously, the 3D object can be combined into the image suitably by repeating the steps shown in FIG. 2. Accordingly, when moving or rotating the marker, the user can see the 3D object moving or changing the display angle in the image on the display unit.

It should be noted that although the aforementioned embodiments illustrate the invention with a captured image having a marker, when the system 100 determines that the captured image has a plurality markers, the system 100 is capable of displaying different 3D objects according to the identity, the rotation state, and the location of each marker. In addition, even when the image capturing unit 110 is moved during the computation of the system 100, the system 100 is capable of tracking the marker continuously to generate the AR image.

A computer program product is further provided in the invention and thereby to the above-described method of providing AR can be applied based on marker tracking. The computer program product mainly is comprised of a plurality of program instructions (such as setting program instructions and deploying program instructions). After the program instructions are loaded into a computer system and executed, each of the steps in the above-described method of providing AR based on marker tracking is realized. Accordingly, the computer system has functions of providing AR based on marker tracking.

In summary, the method, the system, and the computer program for providing AR based on marker tracking of this invention are related to estimation of the spatial relationship between the marker and the image capturing unit in the real 3D space and suitably adjusts the rotation angle and the displacement of the 3D object displayed in the image accordingly, so as to generate the AR image combining the real background and the 3D object. In an environment with large brightness variation, the accuracy of the tracking results can be ensured by utilizing the edge detection method. Furthermore, the normalization of shape and grayscale value also reduce identification errors, such that the augmented reality can be presented more efficiently.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method of providing augmented reality based on marker tracking technology, the method comprising:
    capturing an image by an image capturing unit;
    determining whether a quadrangle is present in the image, wherein the step of determining whether the quadrangle is present in the image comprises:
        converting the image into a grayscale image;
        performing a mask computation on the grayscale image to acquire a plurality of edge pixels in the image and calculating a corresponding direction of each of the edge pixels;
        defining parts of the edge pixels as a plurality of skeleton pixels according to relative positions of the edge pixels;
        scanning the image according in a specific order, and once one of the skeleton pixels is scanned, determining whether a scanning direction is changed five times in a process of continuously acquiring another one of the skeleton pixels or another one of the edge pixels; and
        when the scanning direction is changed five times in the process of continuously acquiring another one of the skeleton pixels or another one of the edge pixels, determining the quadrangle to be present in the image and calculating four vertex coordinates of the quadrangle;
    when the quadrangle is found in the image, determining whether the quadrangle is a marker in accordance with a marker definition;
    when the quadrangle is determined to be the marker, identifying an order of four vertex coordinates of a marker image and identifying an identity of the marker;
    determining a rotation state of the marker according to the vertex coordinates of the marker image and calculating a relative displacement between the marker and the image capturing unit; and
    combining a three-dimensional object to the image according to the relative displacement, the rotation state, and the identity of the marker to generate an augmented reality image.

2. The method of providing the augmented reality based on the marker tracking technology as claimed in claim 1, wherein the step of performing the mask computation on the grayscale image to acquire the edge pixels in the image and calculating the corresponding direction of each of the edge pixels comprises:
    performing a convolution mask computation on the grayscale image to respectively acquire a first responsive value and a second responsive value of each pixel in the grayscale image; and
    when a sum of each absolute value of the first responsive value and the second responsive value of each of the pixels is larger than a predetermined value, determining the pixel to be one of the edge pixels and defining the corresponding direction according to the first responsive value and the second responsive value of the pixel.

3. The method of providing the augmented reality based on the marker tracking technology as claimed in claim 1, wherein the marker definition comprises a layout prototype, and the step of determining whether the quadrangle is the marker comprises:
    defining four vertex coordinates of a square image according to a predetermined length;

finding out a pixel corresponding relationship between the grayscale image and the square image according to the vertex coordinates of the quadrangle and the vertex coordinates of the square image, so as to build the square image by using the grayscale image;

defining a grayscale threshold value by using each pixel value of a plurality of specific locations in the square image;

converting the square image into a monochrome binary image according to the grayscale threshold value;

dividing the monochrome binary image into a plurality of color blocks according to a predetermined dimension; and when a distribution of the color blocks complies with the layout prototype, determining the quadrangle to be the marker.

4. The method of providing the augmented reality based on the marker tracking technology as claimed in claim 1, wherein the step of determining the rotation state of the marker according to the vertex coordinates of the marker image comprises:

defining a coordinate corresponding relationship between a three-dimensional coordinate system of the image capturing unit and a two-dimensional coordinate system of the image;

converting the vertex coordinates of the marker image into four three-dimensional vertex coordinates of the marker image in the three-dimensional coordinate system according to the coordinate corresponding relationship;

creating four vectors according to the three-dimensional vertex coordinates of the marker image; and forming a rotation matrix by using the vectors to indicate the rotation state of the marker.

5. The method of providing the augmented reality based on the marker tracking technology as claimed in claim 4, wherein the step of calculating the relative displacement between the marker and the image capturing unit comprises:

selecting two diagonal vertices from four vertices of the marker;

acquiring two projection points of the two diagonal vertices projected on a plane of the three-dimensional coordinate system;

calculating two auxiliary segments constituted by projecting the projection points to a specific axis of the plane;

calculating a target segment by using the auxiliary segments;

acquiring coordinates of an intersection between diagonal lines constituted by the vertex coordinates of the marker image in the three-dimensional coordinate system; and calculating the relative displacement according to the coordinates of the intersection and the target segment.

6. The method of providing the augmented reality based on the marker tracking technology as claimed in claim 1, wherein the step of combining the three-dimensional object to the image according to the relative displacement, the rotation state, and the identity of the marker to generate the augmented reality image comprises:

selecting the three-dimensional object corresponding to the identity of the marker;

adjusting a size of the three-dimensional object in the image according to the relative displacement; and adjusting a display angle of the three-dimensional object in the image according to the rotation state of the marker.

7. A system of providing augmented reality, comprising:

an image capturing unit which is used for capturing an image;

a quadrangle detecting unit coupled to the image capturing unit which is used for determining whether a quadrangle is present in the image, wherein the quadrangle detecting unit converts the image into a grayscale image, performs a mask computation on the grayscale image to acquire a plurality of edge pixels in the image and calculate a corresponding direction of each of the edge pixels, and defines a portion of the edge pixels as a plurality of skeleton pixels according to relative positions of the edge pixels, wherein the quadrangle detecting unit scans the image according to a specific order and determines whether a scanning direction is changed five times in a process of continuously acquiring another one of the skeleton pixels or another one of the edge pixels once one of the skeleton pixels is scanned;

when the scanning direction is changed five times in the process of continuously acquiring another skeleton pixel or edge pixel, the quadrangle detecting unit determines the quadrangle to be present in the image and calculates four vertex coordinates of the quadrangle;

a marker identifying unit coupled to the quadrangle detecting unit which is used for determining whether the quadrangle is a marker satisfying a marker definition when the quadrangle is found in the image, and identifying an order of four vertex coordinates of a marker image and identifying an identity of the marker when the quadrangle is determined to be the marker;

a marker feature capturing unit coupled to the marker identifying unit which is used for determining a rotation state of the marker according to the vertex coordinates of the marker image, and calculating a relative displacement between the marker and the image capturing unit; and an image integrating unit coupled to the marker feature capturing unit which is used for combining a three-dimensional object to the image according to the relative displacement, the rotation state, and the identity of the marker to generate an augmented reality image.

8. The system of providing the augmented reality as claimed in claim 7, wherein the quadrangle detecting unit performs a convolution mask computation on the grayscale image to respectively acquire a first responsive value and a second responsive value of each pixel in the grayscale image; and when a sum of each absolute value of the first responsive value and the second responsive value of each of the pixels is larger than a predetermined value, the quadrangle detecting unit determines the pixel to be one of the edge pixels and defines the corresponding direction according to the first responsive value and the second responsive value of the pixel.

9. The system of providing the augmented reality as claimed in claim 7, wherein the marker definition comprises a layout prototype and the marker identifying unit defines four vertex coordinates of a square image according to a predetermined length;

the marker identifying unit finds out a pixel corresponding relationship between the grayscale image and the square image according to the vertex coordinates of the quadrangle and the vertex coordinates of the square image, so as to build the square image by using the grayscale image;

the marker identifying unit defines a grayscale threshold value by using each pixel value of a plurality of specific locations in the square image to convert the square image into a monochrome binary image according to the grayscale threshold value;

the marker identifying unit divides the monochrome binary image into a plurality of color blocks according to a predetermined dimension; and when a distribution of the color blocks complies with the layout prototype, the marker identifying unit determines the quadrangle to be the marker.

10. The system of providing the augmented reality as claimed in claim 7, wherein the marker feature capturing unit defines a coordinate corresponding relationship between a three-dimensional coordinate system of the image capturing unit and a two-dimensional coordinate system of the image;

the marker feature capturing unit converts the vertex coordinates of the marker image into four three-dimensional vertex coordinates of the marker image in the three-dimensional coordinate system according to the coordinate corresponding relationship;

the marker feature capturing unit creates four vectors according to the three-dimensional vertex coordinates of the marker image; and the marker feature capturing unit uses the vectors to form a rotation matrix denoting the rotation state of the marker.

11. The system of providing the augmented reality as claimed in claim 10, wherein the marker feature capturing unit selects two diagonal vertices from four vertices of the marker;

the marker feature capturing unit acquires two projection points of the two diagonal vertices projected on a plane of the three-dimensional coordinate system;

the marker feature capturing unit calculates two auxiliary segments constituted by projecting the projection points to a specific axis of the plane;

the marker feature capturing unit calculates a target segment by using the auxiliary segments; the marker feature capturing unit acquires coordinates of an intersection between diagonal lines constituted by the vertex coordinates of the marker image in the three-dimensional coordinate system; and the marker feature capturing unit calculates the relative displacement according to the coordinates of the intersection and the target segment.

12. The system of providing the augmented reality as claimed in claim 7, wherein the image integrating unit selects the three-dimensional object corresponding to the identity of the marker, adjusts a size of the three-dimensional object in the image according to the relative displacement, and adjusts a display angle of the three-dimensional object in the image according to the rotation state to generate the augmented reality image.

13. A non-transitory computer-readable medium, comprising at least one program instruction, the at least one program instruction being loaded into a computer system to execute following steps:

acquiring an image captured by an image capturing unit;

determining whether a quadrangle is present in the image, wherein when determining whether the quadrangle is present in the image, the at least one program instruction converts the image into a grayscale image, performs a mask computation on the grayscale image to acquire a plurality of edge pixels in the image and calculate a corresponding direction of each of the edge pixels, and defines a portion of the edge pixels as a plurality of skeleton pixels according to relative positions of the edge pixels, the at least one program instruction scans the image according to a specific order, and once one of the skeleton pixels is scanned, determines whether a scanning direction is changed five times in a process of continuously acquiring another one of the skeleton pixels or another one of the edge pixels, when the scanning direction is changed five times in the process of continuously acquiring another one of the skeleton pixels or another one of the edge pixels, the at least one program instruction determines the quadrangle to be present in the image and calculates four vertex coordinates of the quadrangle;

when the quadrangle is found in the image, determining whether the quadrangle is a marker accordance with a marker definition;

when the quadrangle is determined to be the marker, identifying an order of four vertex coordinates of a marker image and identifying an identity of the marker;

determining a rotation state of the marker according to the vertex coordinates of the marker image and calculating a relative displacement between the marker and the image capturing unit; and combining a three-dimensional object to the image according to the relative displacement, the rotation state, and the identity of the marker to generate an augmented reality image.

14. The non-transitory computer-readable medium as claimed in claim 13, wherein when performing the mask computation on the grayscale image to acquire the edge pixels in the image and calculate the corresponding direction of each of the edge pixels, the at least one program instruction performs a convolution mask computation on the grayscale image to respectively acquire a first responsive value and a second responsive value of each pixel in the grayscale image; and when a sum of each absolute value of the first responsive value and the second responsive value of each of the pixels is larger than a predetermined value, the at least one program instruction determines the pixel to be one of the edge pixels and defines the corresponding direction according to the first responsive value and the second responsive value of the pixel.

15. The non-transitory computer-readable medium as claimed in claim 13, wherein the marker definition comprises a layout prototype, and when determining whether the quadrangle is the marker, the at least one program instruction defines four vertex coordinates of a square image according to a predetermined length;

the at least one program instruction finds out a pixel corresponding relationship between the grayscale image and the square image according to the vertex coordinates of the quadrangle and the vertex coordinates of the square image, so as to build the square image by using the grayscale image;

the at least one program instruction defines a grayscale threshold value by using each pixel value of a plurality of specific locations in the square image to convert the square image into a monochrome binary image according to the grayscale threshold value;

the at least one program instruction divides the monochrome binary image into a plurality of color blocks according to a predetermined dimension; and when a distribution of the color blocks complies with the layout prototype, the at least one program instruction determines the quadrangle to be the marker.

16. The non-transitory computer-readable medium as claimed in claim 13, wherein when determining the rotation state of the marker according to the vertex coordinates of the marker image, the at least one program instruction defines a coordinate corresponding relationship between a three-dimensional coordinate system of the image capturing unit and a two-dimensional coordinate system of the image;

the at least one program instruction converts the vertex coordinates of the marker image into four three-dimensional vertex coordinates of the marker image in the three-dimensional coordinate system according to the coordinate corresponding relationship;

the at least one program instruction creates four vectors according to the three-dimensional vertex coordinates of the marker image; and the at least one program instruction form a rotation matrix representing the rotation state of the marker by using the vectors to form a rotation matrix denoting the rotation state of the marker.

17. The non-transitory computer-readable medium as claimed in claim 16, wherein when calculating the relative displacement between the marker and the image capturing unit, the at least one program instruction selects the two diagonal vertices from four vertices of the marker;

the at least one program instruction acquires two projection points of the two diagonal vertices projected on a plane of the three-dimensional coordinate system;

the at least one program instruction calculates two auxiliary segments constituted by projecting the projection points to a specific axis of the plane;

the at least one program instruction calculates a target segment by using the auxiliary segments; the at least one program instruction acquires coordinates of an intersection between diagonal lines constituted by the vertex coordinates of the marker image in the three-dimensional coordinate system; and the at least one program instruction calculates the relative displacement according to the coordinates of the intersection and the target segment.

18. The non-transitory computer-readable medium as claimed in claim 13, wherein when combining the three-dimensional object to the image according to the relative displacement, the rotation state, and the identity of the marker to generate the augmented reality image, the at least one program instruction selects the three-dimensional object corresponding to the identity of the marker, adjusts a size of the three-dimensional object in the image according to the relative displacement, and adjusts a display angle of the three-dimensional object in the image according to the rotation state.

* * * * *